Patented Aug. 2, 1938

2,125,847

UNITED STATES PATENT OFFICE 2,125,847

LAMINATED PRESSED WALLBOARD

John H. McKenzie, Chicago, Ill., assignor to Marbon Corporation, a corporation of Delaware No Drawing. Application June 13, 1936, Serial No. 85,127

7 Claims. (Cl. 154—45.9)

This invention relates to composite articles and particularly to molded laminated articles. The preferred articles include a lamina of high resin content fibre board integrally united to a lamina of a composition comprising a halogen containing rubber derivative.

It has been proposed to make composite articles of a large number of materials, and in some cases laminated products have been produced by applying a preformed sheet of a synthetic resinous material to a base ply and subjecting the assembly to heat and pressure so that the ply of resinous material is integrally bonded to the base material. Flexible laminated products and rigid laminated products have been made. The number of plies and the nature of the plies have been widely varied.

Halogen containing rubber derivatives, preferably rubber hydrochloride, may be united to a large number of base materials by superimposing a sheet of rubber hydrochloride on a base material and subjecting the assembly to heat and pressure. Various materials such as wood, metal, paper, fabric may be laminated with rubber hydrochloride. This preformed sheet method is particularly suitable for laminating rubber hydrochloride to porous materials since with porous materials the use of solutions of rubber hydrochloride is uneconomical due to the absorption of the solution. Among the porous materials which may be laminated with rubber hydrochloride are wall boards of various types, such as fibre board, plywood, gypsum board, pressed bagasse and the like. When such materials are laminated with rubber hydrochloride a resilient, moisture proof, alcohol resistant surface is obtained which may have an embossed, dull or high gloss surface as desired, according to the type of molding plate or calender roll that is used. Such laminated products are useful as panels, floor tile and table tops.

I have found that a pressed wood fibre board of a type which contains a high proportion of the lignin resins originally present in the wood is particularly suitable when used in conjunction with rubber hydrochlorides. A fibre board of this high resin type is made by chipping wood such as Georgia pine into small pieces, subjecting the wood to the explosive action of steam, and then pressing the fibres. These sheets are characterized by high strength and resistance against warping. One type of this material is known as Masonite.

I have also found that the lignin resins aid in the bonding of the rubber hydrochloride to the fibre board. The heat and pressure used in the laminating operation flows the solid rubber hydrochloride into the pores of the fibre board and in intimate contact with the fibre board and the resins therein. This gives a bond of great strength and a composite article which will withstand shock and even slight flexing without separation of the laminations. Unlike other plastic and resinous materials the rubber hydrochloride does not enhance warping, but on the contrary appears to give a superior non-warping composite sheet. I have found that all halogen containing rubber derivatives may be bonded to high resin content fibre board to give a product of great strength and toughness. The preferred halogen containing rubber derivative, however, is the type known as crystalline, saturated type rubber hydrochloride, which may be produced by reacting undissolved rubber with gaseous hydrogen chloride at elevated temperatures. The crystalline, saturated rubber hydrochloride gives a surface which is unaffected by all common liquids such as water, alcohol, gasoline, and is resistant to cleaning fluids such as benzol and carbon tetrachloride. It also has superior toughness and flexibility. Only slightly less resistant and less flexible is the amorphous rubber hydrochloride. Although rubber halides may be used for some purposes their instability to heat and light and the inherent brittleness of the saturated oil resistant rubber halides makes them of little value, compared to the rubber hydrohalides. In general, also a substantially saturated rubber hydrohalide is preferred, and these should be stabilized against heat disintegration by means of a basic stabilizer such as magnesium oxide, calcium oxide or hydroxide, litharge, barium hydroxide and the like; and against light disintegration by means of photochemical inhibitor such as heptaldoxime incorporated in the rubber hydrochloride composition. Titanium dioxide (rayox) has been found of value, but other fillers, particularly those of high density and small particle size may be used, as for example, whiting, blanc fixe, wood flour may be used and for some purposes ground wood fibre of the same character as the wood fibre of pressed base board may be incorporated with the rubber hydrochloride. Waxes such as opal wax, paraffin, carnauba wax, may be added to the rubber hydrochloride composition and give improved sheen, slip and moisture proofness to the surface. Plasticizers such as butyl stearate, cumarone, hydrogenated ethyl abietate may be added, and are particularly desirable for the amorphous rubber hydrochloride or rubber chloride. However, with the crystalline rubber hydrochloride the inherent flexibility is such that high proportions of fillers may be added without giving a brittle product even in the absence of plasticizers.

The following example illustrates my invention:

A composition of

| | Parts |
|---|---|
| Crystalline rubber hydrochloride | 100 |
| Titanium dioxide (rayox) | 100 |
| Magnesium oxide | 15 |
| Hexamethylene tetramine | 2 |
| Opal wax (diol of M. P. 77.5–80.9° C.) | 5 | was fluxed together into a homogeneous mass on a mill, and then calendered into a thin sheet. The sheet was then cut to size, superimposed on steam exploded type lignin containing cellulose fibre board (Masonite) and the assembly subjected to heat and pressure sufficient to flow the rubber hydrochloride composition into the pores of the fibre board and produce a thin surface sheet of rubber hydrochloride composition on the fibre board. A temperature of 268° F. and molding pressure of about 200 pounds per square inch was found to be sufficient. Molding plates having a highly polished surface were used during the pressing operation. A composite sheet particularly adapted for table tops or wall panels was produced which was strong, having a high gloss surface resistant to water, alcohol, gasoline, oils, turpentine, cleaning fluids such as benzol, carbon tetrachloride, hydrochloric acid, sulfuric acid; soaps, caustic and all common fluids was obtained.

It is to be understood that many details may be varied without departing from the spirit of this invention. The pressure and molding time and temperature may be varied widely. The surface may be embossed or given a dull or gloss finish by the use of suitable plates during the molding operation. The proportion of filler may be varied widely from none to say about 3 parts of filler to 1 part of rubber hydrochloride. The rayox filler, however, gives good acid resistance, clear, white color and all around fine appearance when used with rubber hydrochloride and is preferred for the laminated products having a high gloss surface.

I claim:

1. A composite article comprising a lamina of fibre board containing a wood resin and a lamina of a composition containing a halogen containing rubber derivative.

2. A composite article comprising a lamina of pressed wood fibre which contains a substantial proportion of wood resins, and a lamina of a halogen containing rubber derivative.

3. A laminated sheet material consisting of a lamina of steam exploded type wood fibre containing wood resins, and a lamina of a composition comprising a rubber hydrochloride.

4. A laminated sheet material comprising a backing of high wood resin content fibre board, and a facing of a moisture, alcohol, oil and acid resistant rubber hydrogen chloride derivative.

5. Tiling consisting of a lamina of high wood resin content fibre board, and a high gloss lamina composed of a composition including an intimate mixture of a rubber hydrochloride, a stabilizer, and a filler.

6. Tiling comprising a lamina of pressed wood fibre containing a wood resin and a lamina securely bonded directly thereto composed of a composition including an intimate mixture of a rubber hydrochloride and a stabilizer therefor.

7. Tiling comprising a lamina of a steam exploded pressed wood fibre containing the natural wood resins, and a lamina securely bonded directly thereto composed of a composition including an intimate mixture of a stabilized crystalline rubber hydrochloride and fillers, said fillers being in approximately the proportion of one part to three parts by weight per one part by weight of rubber hydrochloride.

JOHN H. McKENZIE.